(12) United States Patent
Liu et al.

(10) Patent No.: US 11,606,584 B2
(45) Date of Patent: *Mar. 14, 2023

(54) METHOD FOR INTELLIGENT BUFFERING FOR OVER THE TOP (OTT) VIDEO DELIVERY

(71) Applicant: AT&T Intellectual Property I, L.P., Atlanta, GA (US)

(72) Inventors: Yali Liu, Dublin, CA (US); Zhengye Liu, Pleasanton, CA (US); Jin Wang, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,036

(22) Filed: Sep. 28, 2021

(65) Prior Publication Data

US 2022/0014802 A1   Jan. 13, 2022

Related U.S. Application Data

(63) Continuation of application No. 16/870,043, filed on May 8, 2020, now Pat. No. 11,166,053, which is a
(Continued)

(51) Int. Cl.
| | |
|---|---|
| *H04N 21/234* | (2011.01) |
| *H04N 21/658* | (2011.01) |
| *H04N 21/442* | (2011.01) |
| *G06N 20/00* | (2019.01) |
| *G06F 17/14* | (2006.01) |

(52) U.S. Cl.
CPC ..... *H04N 21/23406* (2013.01); *G06F 17/142* (2013.01); *G06N 20/00* (2019.01); *H04N 21/44204* (2013.01); *H04N 21/6582* (2013.01)

(58) Field of Classification Search
CPC ....... H04N 21/23406; H04N 21/44204; H04N 21/6582; G06N 20/00
See application file for complete search history.

(56) References Cited

U.S. PATENT DOCUMENTS

| | | | |
|---|---|---|---|
| 7,248,564 B1 | 7/2007 | Grosdidier et al. | |
| 7,660,248 B1 | 2/2010 | Duffield et al. | |

(Continued)

FOREIGN PATENT DOCUMENTS

| | | |
|---|---|---|
| CN | 102271090 B | 9/2013 |
| CN | 105787512 A | 7/2016 |

(Continued)

OTHER PUBLICATIONS

"Definition of "vector" from te Dictionary.com", waybackmachine, Nov. 9, 2017, 4 pages.
(Continued)

*Primary Examiner* — Michael Robert Cammarata
(74) *Attorney, Agent, or Firm* — Guntin & Gust, PLC; Robert Gingher

(57) ABSTRACT

Aspects of the subject disclosure may include, for example, selecting a set of traffic counters, wherein the traffic counters provide a profile of viewing habits of a user, and wherein the traffic counters are extracted from video streaming by the user; predicting a size of a video buffer based on the traffic counters selected; and building the video buffer based on the predicted size. Other embodiments are disclosed.

20 Claims, 7 Drawing Sheets

Related U.S. Application Data continuation of application No. 15/912,656, filed on Mar. 6, 2018, now Pat. No. 10,694,221.

(56) References Cited

U.S. PATENT DOCUMENTS

| | | | |
|---|---|---|---|
| 8,539,221 | B2 | 9/2013 | Tremblay et al. |
| 8,624,908 | B1 | 1/2014 | Knee et al. |
| 8,732,326 | B2 | 5/2014 | Murata et al. |
| 8,817,094 | B1 | 8/2014 | Reasoner et al. |
| 9,021,537 | B2 | 4/2015 | Peters et al. |
| 9,112,938 | B2 | 8/2015 | Tippin et al. |
| 9,191,284 | B2 | 11/2015 | Kordasiewicz et al. |
| 9,288,220 | B2 | 3/2016 | West et al. |
| 9,313,533 | B2 | 4/2016 | Zhang et al. |
| 9,349,102 | B2 | 5/2016 | Jin et al. |
| 9,350,785 | B2 | 5/2016 | Ahlawat et al. |
| 9,451,306 | B2 | 9/2016 | Sarukkai et al. |
| 9,491,078 | B2 | 11/2016 | Sailer et al. |
| 9,582,786 | B2 | 2/2017 | Gubin et al. |
| 9,583,140 | B1 | 2/2017 | Rady |
| 9,635,402 | B1 | 4/2017 | Toner et al. |
| 9,722,936 | B2 | 8/2017 | Zhou et al. |
| 9,740,278 | B2 | 8/2017 | Baldwin et al. |
| 9,813,310 | B1 | 11/2017 | Sieracki et al. |
| 10,452,993 | B1 | 10/2019 | Hart et al. |
| 2005/0138658 | A1 | 6/2005 | Bryan et al. |
| 2005/0193414 | A1 | 9/2005 | Horvitz et al. |
| 2008/0310814 | A1 | 12/2008 | Bowra et al. |
| 2010/0164731 | A1 | 7/2010 | Xie et al. |
| 2010/0208064 | A1 | 8/2010 | Liu et al. |
| 2012/0084392 | A1 | 4/2012 | Lipfert et al. |
| 2012/0117225 | A1 | 5/2012 | Kordasiewicz et al. |
| 2012/0159558 | A1 | 6/2012 | Whyte et al. |
| 2014/0189735 | A1 | 7/2014 | Cudak et al. |
| 2014/0321290 | A1 | 10/2014 | Jin et al. |
| 2015/0161518 | A1 | 6/2015 | McCann et al. |
| 2016/0364606 | A1 | 12/2016 | Conway et al. |
| 2017/0070781 | A1 | 3/2017 | Bar Yanai et al. |
| 2017/0085617 | A1 | 3/2017 | Bovik et al. |
| 2017/0093648 | A1 | 3/2017 | ElArabawy et al. |
| 2017/0111672 | A1 | 4/2017 | Ramamurthy et al. |
| 2017/0126528 | A1 | 5/2017 | Padmanabhan et al. |
| 2017/0181037 | A1 | 6/2017 | Zaghloul |
| 2017/0188102 | A1 | 6/2017 | Zhang et al. |
| 2017/0259177 | A1 | 9/2017 | Aghdaie et al. |
| 2018/0115567 | A1 | 4/2018 | El-moussa et al. |
| 2018/0139214 | A1 | 5/2018 | Anderson et al. |
| 2018/0212992 | A1 | 7/2018 | Nikolaev et al. |
| 2019/0028766 | A1 | 1/2019 | Wold et al. |
| 2019/0279113 | A1 | 9/2019 | Liu et al. |
| 2019/0281333 | A1 | 9/2019 | Liu et al. |
| 2020/0267425 | A1 | 8/2020 | Liu et al. |

FOREIGN PATENT DOCUMENTS

| | | |
|---|---|---|
| CN | 105897736 A | 8/2016 |
| EP | 2211504 A1 | 7/2010 |
| WO | 2016115319 A1 | 7/2016 |
| WO | 2016151419 A1 | 9/2016 |
| WO | 2017102031 A1 | 6/2017 |
| WO | 2017221152 A1 | 12/2017 |

OTHER PUBLICATIONS

"Rouse "DCE (Distributed Computing Environment)"", TechTarget Network, Apr. 2007, 3 pages.

Alshammari, Riyad et al., "Machine Learning Based Encrypted Traffic Classification: Identifying SSH and Skype", Computational Intelligence for Security and Defense Applications, 2009, CISDA2009, IEEE Symposium, IEEE, 2009., 2009, 8 pages.

Bakhshi, Taimur, "On Internet Traffic Classification: A Two-Phased Machine Learning Approach", Journal of Computer Networks and Communications, vol. 2016, Article ID 2048302, 2016, 1-22.

Balachandran, et al., "Developing a predictive model of quality of experience for internet video", 2013, 12 pages.

Bar-Yanai, Roni et al., "Realtime Classification for Encrypted Traffic", International Symposium on Experimental Algorithms, Springer, Berlin, Heidelberg, 2010., 2010, 373-385.

Hongzi, Mao, "Neural adaptive video streaming with pensieve", 2017, 59 pages.

Horovitz, et al., "Maxtream: Stabilizing P2P streaming by active prediction of behavior patterns", 2009, 8 pages.

Kos, M. et al., "Bandwidth allocation for BVR video service in highspeed networks based on adaptive filtering", MELECON '98, 9th Mediterranean Electrotechnical Conference Proceedings, pp. 688-692 vol. 2, (Cat. No. 98CH36056), Tel-Aviv, Israel; doi 10.1109/MELCON.1998.699303., 1998, 5 pages.

Liu, Yali, "Method for Intelligent Buffering for Over the Top (OTT) Video Delivery", U.S. Appl. No. 15/912,656, filed Mar. 6, 2018, 37 pages.

Mohapatra, B. N. et al., "FFT and sparse FFT techniques and applications", 2017 Fourteenth International Conference on Wireless and Optical Communications Networks (WOCN), Mumbai, India, pp. 1-5, doi: 10.1109/WOCN.2017.8065859, 2017, 5 pages.

Mushtaq, et al., "Empirical study based on machine learning approach to assess the QoS/QoE correlation", 2012, 8 pages.

Nguyen, Thuy T. et al., "A survey of techniques for internet traffic classification using machine learning", IEEE Communications Surveys Tutorials 10.4, 2008, 56-76.

Vladutu, Alina et al., "Internet Traffic Classification Based on Flows Statistical Properties With Machine Learning", International Journal of Network Management 27.3 (2017), 2015.

Williams, Nigel et al., "A Preliminary Performance Comparison of Five Machine Learning Algorithms for Practical IP Traffic Flow Classification", ACM SIGCOMM Computer Communication Review 36.5 (2006): 5-16., Oct. 2006, pp. 7-15.

Zander, Sebastian et al., "Automated Traffic Classification and Application Identification Using Machine Learning", Proceedings of the IEEE Conference on Local Computer Networks, 2005, 30th Anniversary, The IEEE Conference, IEEE, 2005., 8 pages.

300

METHOD FOR INTELLIGENT BUFFERING FOR OVER THE TOP (OTT) VIDEO DELIVERY

CROSS REFERENCE TO RELATED APPLICATIONS

This application is a continuation of U.S. patent application Ser. No. 16/870,043 filed May 8, 2020, which is a continuation of U.S. patent application Ser. No. 15/912,656 filed on Mar. 6, 2018 (now U.S. Pat. No. 10,694,221). The contents of the foregoing is hereby incorporated by reference into this application as if set forth herein in full.

FIELD OF THE DISCLOSURE

The subject disclosure relates to a method for intelligent buffering for over the top video delivery.

BACKGROUND

A large portion of digital network radio bandwidth is consumed by Internet video traffic. A mobility network operator may spend billions of dollars on purchasing radio resources. Efficient use of the purchased radio resources, especially video data, is warranted.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for estimating a video buffer size for users. Other embodiments are described in the subject disclosure.

One or more aspects of the subject disclosure include a device, comprising: a processing system including a processor; and a memory that stores executable instructions that, when executed by the processing system, facilitate performance of operations, the operations comprising: selecting a set of traffic counters, wherein the traffic counters provide a profile of viewing habits of a user, and wherein the traffic counters are extracted from a video streamed by the user; predicting a size of a video buffer based on the traffic counters selected; and building the video buffer based on the predicted size.

One or more aspects of the subject disclosure include a machine-readable medium, comprising executable instructions that, when executed by a processing system including a processor, facilitate performance of operations, the operations comprising: examining video streaming by a user to create a set of traffic counters, wherein the traffic counters provide a profile of viewing habits of a user; creating a prediction model based on the traffic counters; and predicting a size of a video buffer based on the prediction model.

One or more aspects of the subject disclosure include a method, comprising: gathering, by a processing system including a processor, a plurality of traffic counters derived from video streaming by a user; mapping, by the processing system, the plurality of traffic counters to create a current traffic feature vector; and applying, by the processing system, a prediction model to the current traffic feature vector to determine a predicted video buffer size.

Figure 1:
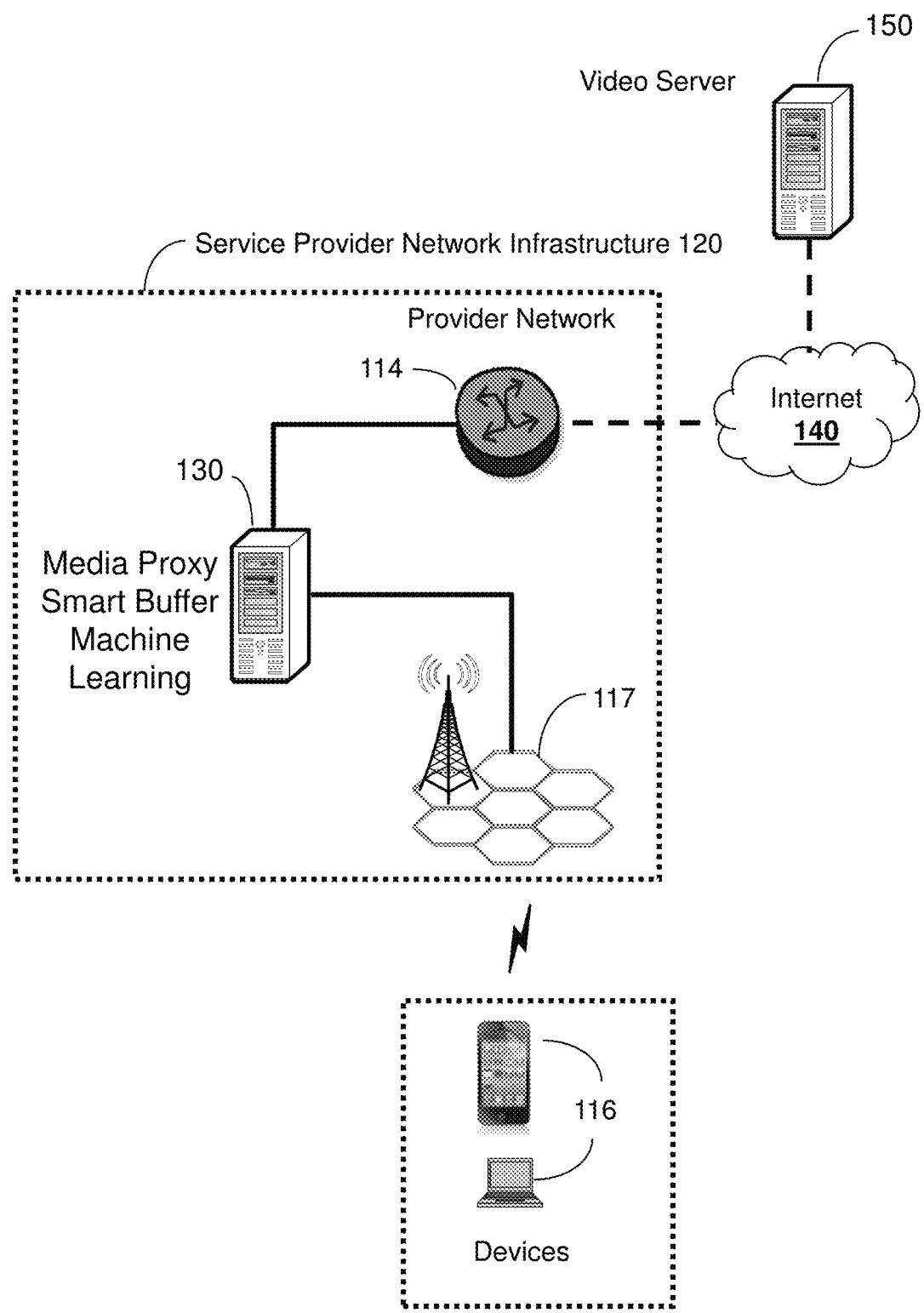
FIG. 1 depicts an illustrative embodiment of a system for buffering video data.

FIG. 1 depicts an illustrative embodiment of a system 100 for buffering video data. As shown, FIG. 1 illustrates a service provider network infrastructure 120 comprising a wireless access base station 117 operating according to common wireless access protocols and a provider network 114. The provider network 114 delivers video data from a video server 150 coupled to the Internet 140 to communication devices 116. Additionally, the service provider network infrastructure 120 incorporates a media proxy 130 that incorporates a smart buffer with machine learning. In an embodiment, the communication devices 116 are in communication with the provider network 114 through a wireless access base station 117.

In an embodiment, a user of a communication device 116 may download video data from the video server 150 over the Internet 140, through provider network 114 and wireless access base station 117, to build 60 seconds worth of video data in a buffer on the communication device 116. But after watching the video for 5 seconds, the user decides to switch to another video. In this case, 55 seconds of video data are wasted, since the data is not decoded, played, and consumed by user. However, the data was transmitted by the wireless access base station 117 to the communication device 116. The transmission is a big waste of network resources, including spectrum at wireless access base station 117, core network bandwidth of the provider network 114, Internet 140 bandwidth, and resources of the video server, etc. Considering the popularity of OTT video applications and the huge amount of video traffic in the Internet, a smart buffering approach that can reduce waste of such network resources is highly desirable.

To ensure quality of experience (QoE) when viewing videos, past solutions might access network conditions, and an advanced buffering algorithm might efficiently predict the buffering time required to ensure playback continuity. Alternatively, a layered streaming algorithm may compensate for variations in the measured available bandwidth from all congestion-controlled senders. However, these solutions assume that the video application schemes are not aware of any information from user behaviors, so that they treat all video consumers equally and accordingly do not collaborate to save radio resources, thereby limiting their efficiency.

Hence, a media proxy 130 having a smart buffer with machine learning may be implemented in an embodiment, by learning users' video viewing behavior. For example, by configuring a smaller video buffer size for users that are less patient, who tend to conduct more video switching, network resources may be conserved. A larger video buffer size can be configured for users that exhibit more patience and tend to watch videos longer. As the video buffer size is configured smartly, network resources can be conserved through reduced transmissions saved by overall downloading/buffering less video data, without sacrificing video QoE.

Different users may present very different video viewing behaviors. The same user may present different video viewing behaviors based on video content. For example, one important viewing behavior is viewing stability, i.e., how long a user may continue to watch a video. Some fewer patient users may switch videos quickly, by watching each individual video with a short time, while other more patient users may watch the same video for a longer time before switching video. These types of video viewing behaviors significantly affect video system design, including buffering, caching, pre-fetching, rate selection, and more. Thus, it is very desirable to learn video viewing behaviors of users with advanced machine learning algorithms and to apply the learnings onto system design.

The key component of such a smart buffering scheme is to understand a user's viewing behavior. Ideally, if the amount of time that each individual user spends watching a particular video could be predicted precisely, the video buffer can be optimally designed and managed, and waste could be minimized, without sacrificing video QoE. For example, if a user "U" is predicted to watch a video "V" for only "T" seconds, where "T" is less than the length of video data that can be stored in video buffer "B," then any data downloaded beyond "T" seconds of video would waste resources, for example, by fully building the buffer "B."

Figure 2A:
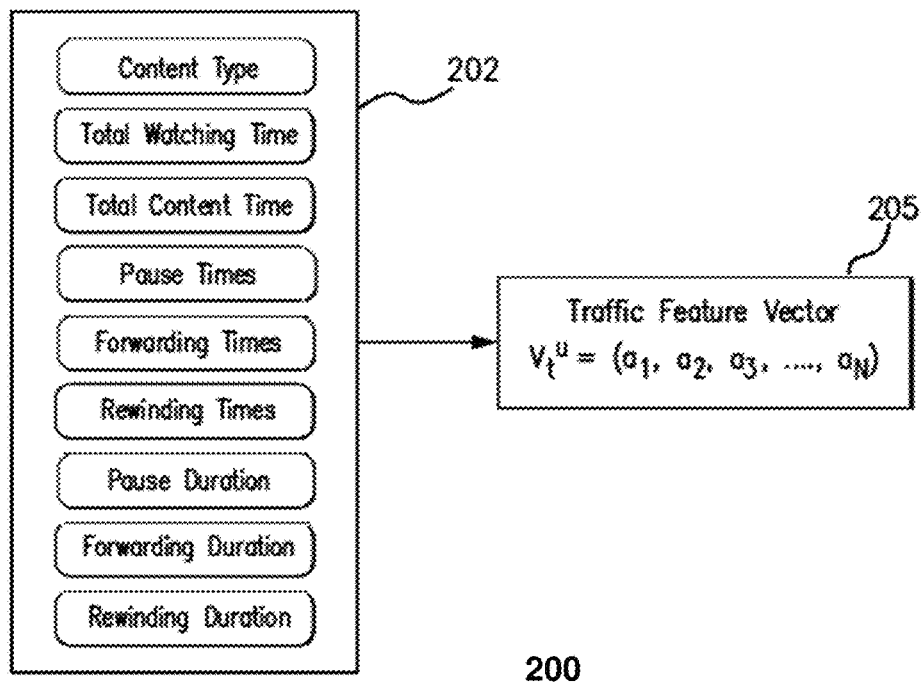
FIG. 2A depicts an illustrative embodiment of a data formation scheme to build a traffic feature vector.

FIG. 2A depicts an illustrative embodiment of a data formation scheme 200 to build a traffic feature vector. As shown in FIG. 2A, a select set of the traffic counters 202, e.g., a video content type, a total watching time, a total content time, a duration of pause time, an amount of forwarding time, an amount of rewind time, forwarding duration and rewinding duration, can be collected from a video streaming flow by the media proxy 130 at a given time t for a particular user u.

In an embodiment, the media proxy 130 retrieves Conviva data from the user u's communication device 116. Conviva data is collected at a video application (app) running in the communication device 116 that uses a Conviva service. The Conviva service records all the details of video viewing behaviors for all users of the app and all videos that are generated by the app.

In another embodiment, the media proxy 130 retrieves data from the main service provider (MSP) of the videos watched. MSP data collected at the MSP records universal resource locator (URL) information for individual hypertext transport protocol (HTTP) requests initiated by the viewing communication device 116. Many major OTT video viewers retrieve video data over the Internet based on HTTP. Thus, video viewing behavior can be obtained from MSP data for major video applications.

In another embodiment, the media proxy 130 retrieves data through deep packet inspection (DPI). For example, DPI can be collected from video flows in a production Long Term Evolution (LTE) network through probes on the user interface between the wireless access base station 117 and a serving gateway, i.e., the S1U interface, but can be extended to future 5G networks. Such data comprises similar information to MSP data, but has more scaled coverage and availability.

The media proxy 130 can apply advanced signature processing, e.g., via Fast Fourier Transform (FFT) for mapping the traffic counters 202 derived through the aforementioned processes to a vector $V_u^t=(a_1, a_2, a_3 \ldots a_N)$, known as a traffic feature vector 205.

Figure 2B:
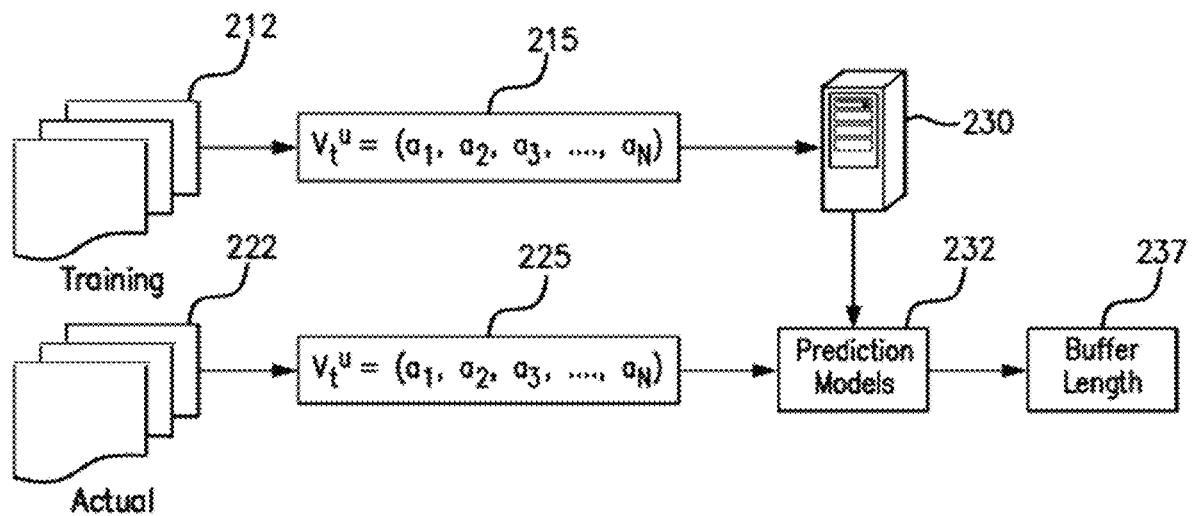
FIG. 2B depicts an illustrative embodiment of a system that predicts video buffer length.

FIG. 2B depicts an illustrative embodiment of a system 210 that predicts video buffer length. Network traffic flowing through a media proxy 230 are used as input to the machine learning algorithm. As shown in FIG. 2B, a set of training data flows 212 are used by a media proxy 230 to create a plurality of traffic feature vectors 215. The media proxy 230 uses the plurality of traffic feature vectors to create prediction models 232 through a machine learning (ML) algorithm. The plurality of traffic feature vectors 215 are used to train and build prediction models 232 that will determine the user's behavior, e.g., estimating whether the video session will be terminated by the user, whether the user may invoke pausing, fast-forwarding or rewinding the video, and ultimately, how long the user will continuously watch the video.

In an embodiment, the prediction model 232 is used to determine whether a video session with the user is in a stable viewing state or not. If the video session is in a stable viewing state, presumably most or all the streamed and buffered data of the video session will be consumed, regardless of available bandwidth. If the video session is not in a stable viewing state, or transitions to an unstable viewing state, the prediction model will limit the buffer size of the video session. The bandwidth limit should be higher, but not much higher, than video rate. Thus, the video session can support required video QoE (as it is higher than the video playing rate), but the video session will not fill a smaller buffer (as the bandwidth is not much higher than video playing rate). Avoiding a very large buffer reduces the streamed-but-abandoned data bytes. Once the behavior is predicted, the system can determine the necessary buffer length.

Several artificial intelligence (AI) models can be applied to classify the stable/unstable viewing states based on traffic pattern detected from the traffic feature vectors 215. For example, a video player simulator may simulate the user's viewing behavior. A stable viewing state can be represented by viewing the video without trick play or video switching. An unstable viewing state can be represented by frequent trick play or video switching. Next, a network traffic simulator may simulate network conditions for a given viewing behavior. A viewing behavior learning agent in the prediction model 232 learns predicts whether the viewing state is stable or unstable from a traffic feature vector 215 derived from the simulated network conditions. A comparer then determines if the predicted viewing state matches the simulated viewing state, and a reward function provides a signal back to the prediction model 232. If the states match, the reward function signal is increased. The process may be repeated with multiple simulations, until the prediction model 232 is properly trained.

Next, the prediction model 232 is applied by the media proxy 230 to a traffic feature vector 225 created from network traffic flow data 222 that flows through media proxy 230. The ML algorithm exploits user behaviors and predicts a buffer demand in the future. The application of the prediction model 232 yields a predicted buffer length 237 and may impose a limit on available bandwidth if an unstable viewing state is predicted.

Figure 2C:
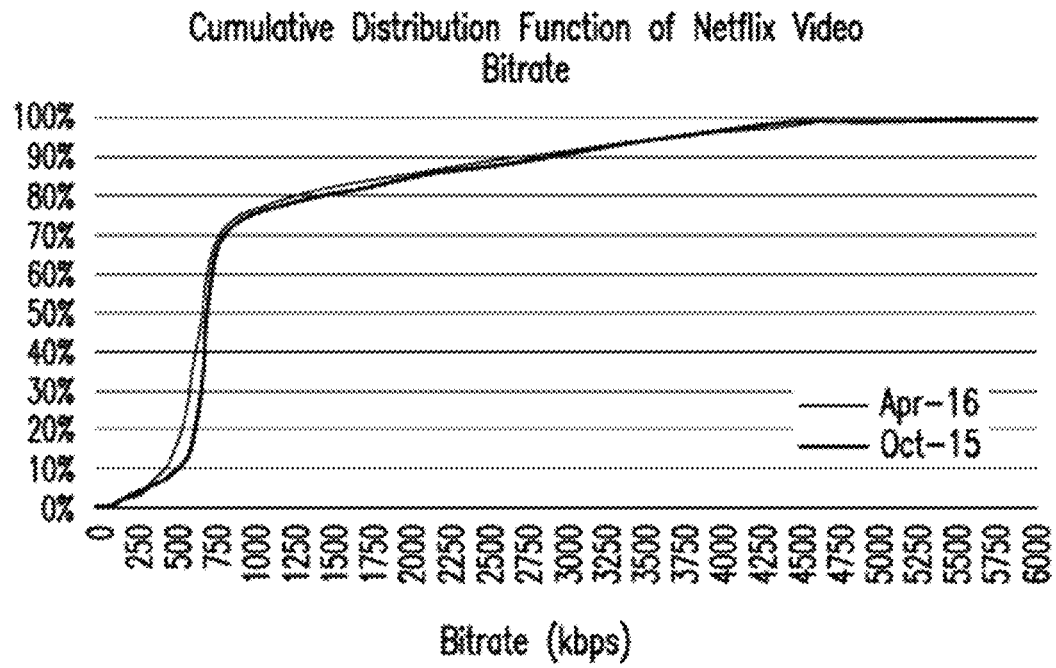
FIG. 2C is a graph illustrating the cumulative distribution function of video bitrate for a particular video source.

FIG. 2C is a graph illustrating the cumulative distribution function of video bandwidth for a video source. In an exemplary embodiment, illustrated in FIG. 2C, a ML algorithm is applied to a known data source to predict viewing behaviors of individual users, to reduce buffered-but-not-viewed bytes via smart video buffering schemes. Significant capital savings are expected by implementing such a system. FIG. 2C shows the Cumulative Distribution Function of Netflix video bandwidth. It is well-known that the maximum video bitrate of Netflix is about 700 kbps. 40% of the video traffic that exhibits a higher video bitrate arises from video fast forward/rewind and start buffer filling. Assuming the buffered-but-not-played video bytes percentage is about ½ of the video traffic buffered, the "effective traffic reduction" can be estimated to be about 20% for Netflix traffic.

Figure 3:
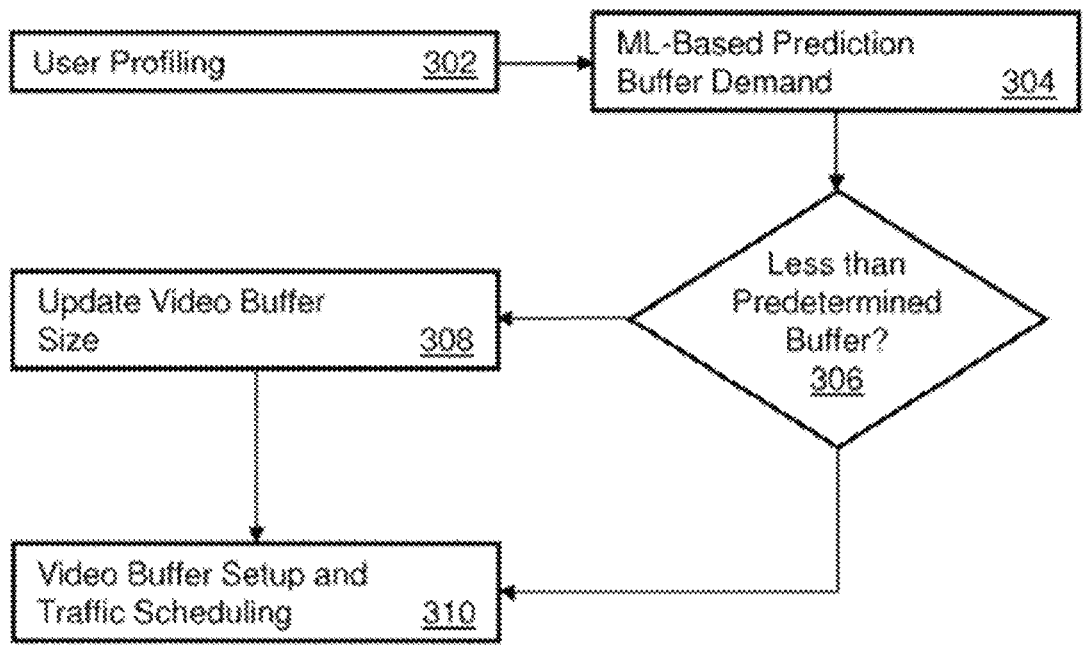
FIG. 3 depicts an illustrative embodiment of a method used in portions of the system described in FIGS. 1, 2A & 2B.

FIG. 3 depicts an illustrative embodiment of a method used in portions of the system described in FIGS. 1, 2A & 2B. As shown in FIG. 3, the method begins at step 302, where user profiling is conducted. A ML algorithm in the media proxy examines traffic flow data for one or more users and develops traffic feature vector(s) for the user(s) from the traffic flow data. Then, the ML algorithm develops a prediction model(s) based on the traffic feature vector(s). Next, in step 304, the ML algorithm applies the prediction model to a new traffic feature vector derived from a traffic flow established by a user to determine a predicted buffer size. Then, in step 306, the system determines whether the predicted video buffer size is less than a predetermined video buffer size (i.e., a default buffer size) currently implemented in the communication device. If so, then in step 308, the video buffer is updated to reflect the smaller, predicted buffer size. If not, then step 308 is skipped, and the method continues with step 310, where video traffic is downloaded by the communication device to fill the video buffer to support watching the video.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
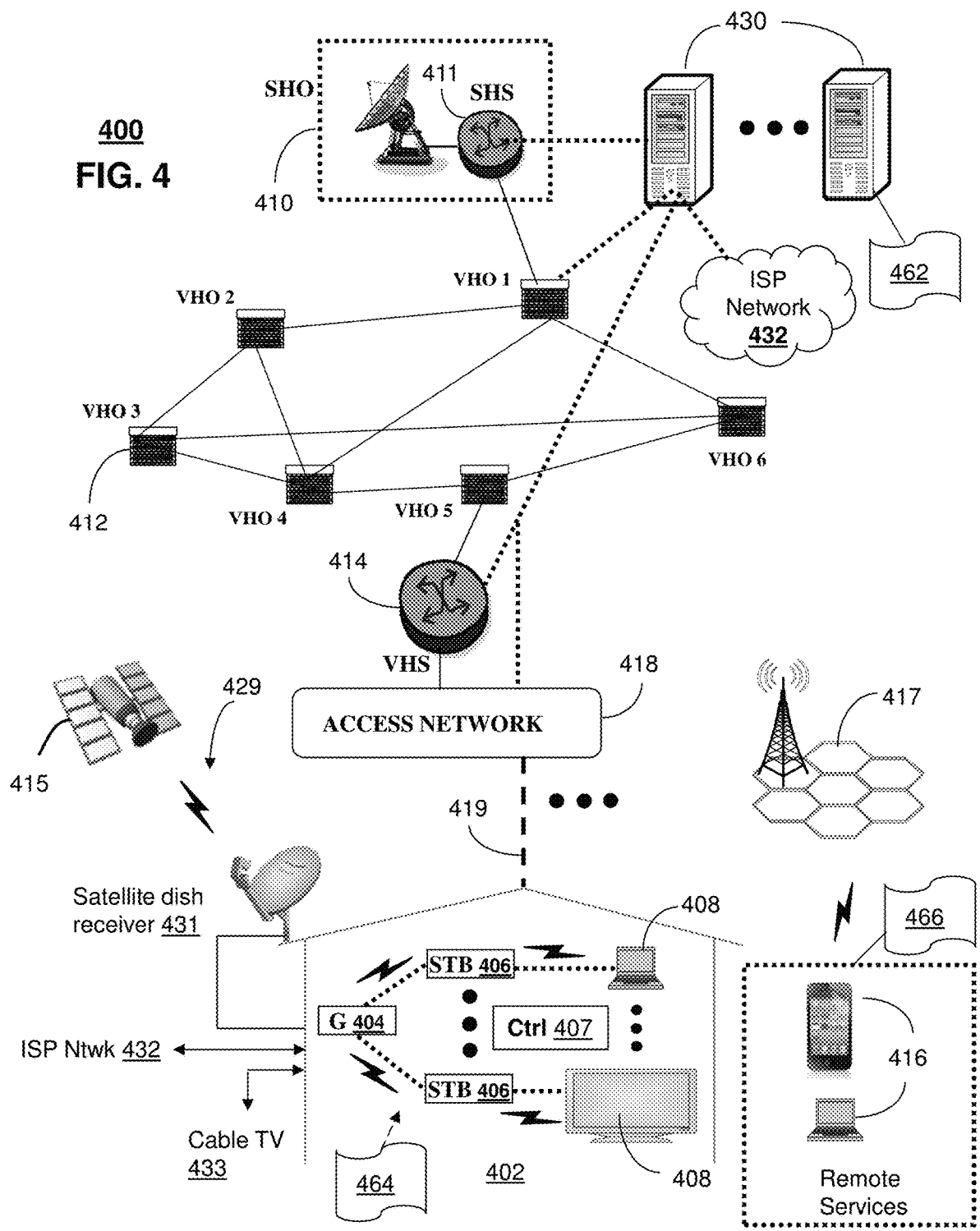
FIGS. 4-5 depict illustrative embodiments of communication systems that provide media services including a system for buffering video data illustrated in FIGS. 1-3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 of FIG. 1 as another representative embodiment of communication system 400. For instance, one or more devices illustrated in the communication system 400 of FIG. 4 could perform operations of the media proxy comprising selecting a set of traffic counters, wherein the traffic counters provide a profile of viewing habits of a user, and wherein the traffic counters are extracted from a video streamed by the user; predicting a size of a video buffer based on the traffic counters selected; and building the video buffer based on the predicted size.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (Wi-Fi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a media proxy (herein referred to as media proxy 430). The media proxy 430 can use computing and communication technology to perform function 462, which can include among other things, the buffer estimation techniques described by method 300 of FIG. 3. For instance, function 462 of server 430 can be like the functions described for media proxy 130 of FIG.

1 in accordance with method 300. The media processors 406 and wireless communication devices 416 can be provisioned with software functions 464 and 466, respectively, to utilize the services of media proxy 430. For instance, functions 464 and 466 of media processors 406 and wireless communication devices 416 can be like the functions described for the communication devices 116 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
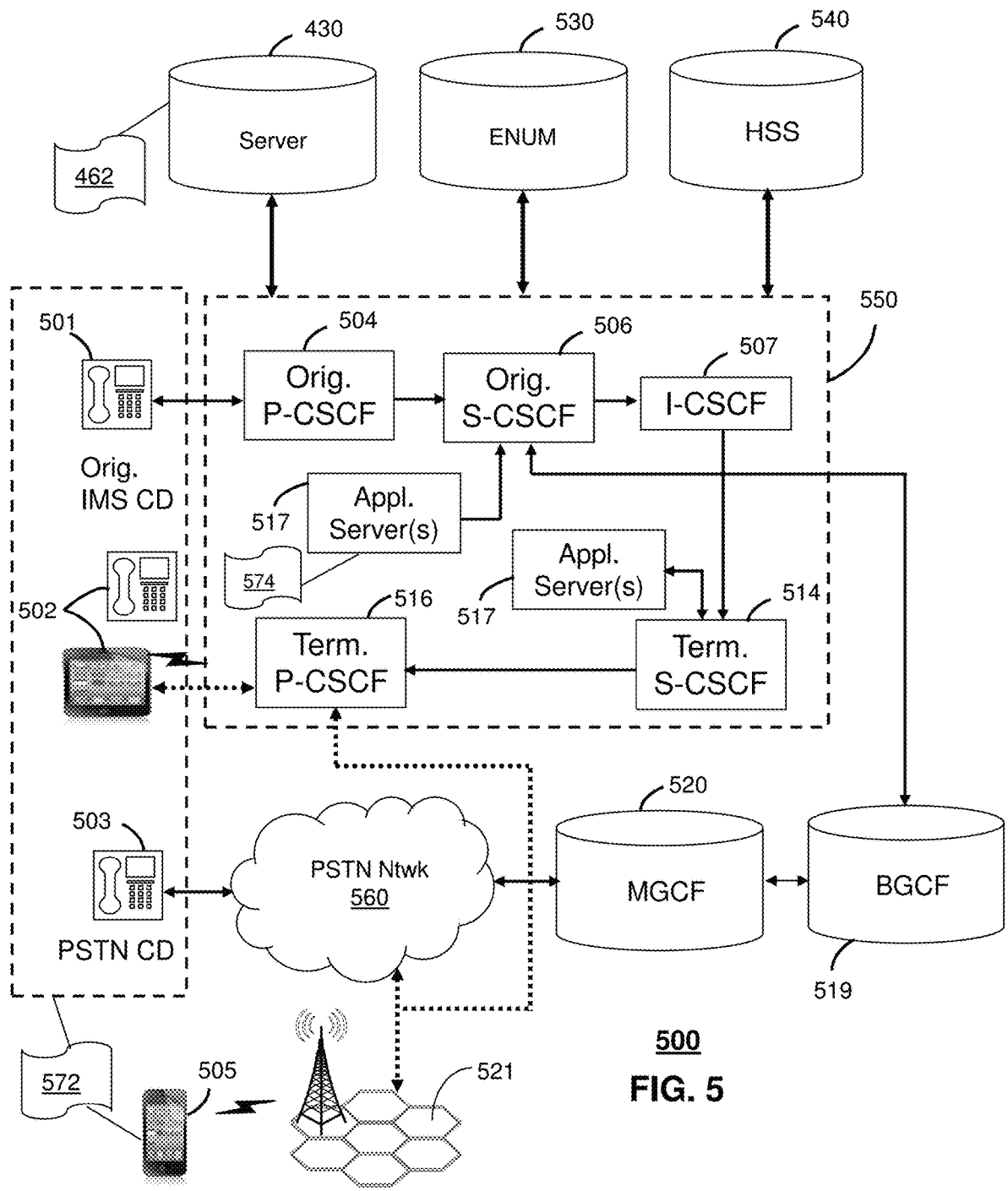

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 of FIG. 4 as another representative embodiment of communication system 400. For instance, one or more devices illustrated in the communication system 500 of FIG. 5 could perform operations of the media proxy comprising selecting a set of traffic counters, wherein the traffic counters provide a profile of viewing habits of a user, and wherein the traffic counters are extracted from a video streamed by the user; predicting a size of a video buffer based on the traffic counters selected; and building the video buffer based on the predicted size.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances, the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a Wi-Fi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media proxy 430 of FIG. 4 can be operably coupled to communication system 500 for purposes like those described above. Media proxy 430 can perform function 462 and thereby provide buffer estimation services to the CDs 501, 502, 503 and 505 of FIG. 5 like the functions described for media proxy 130 of FIG. 1 in accordance with method 300 of FIG. 3. CDs 501, 502, 503 and 505, which can be adapted with software to perform function 572 to utilize the services of the media proxy 430 like the functions described for communication devices 116 of FIG. 1 in accordance with method 300 of FIG. 3. Media proxy 430 can be an integral part of the application server(s) 517 performing function 574, which can be substantially like function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
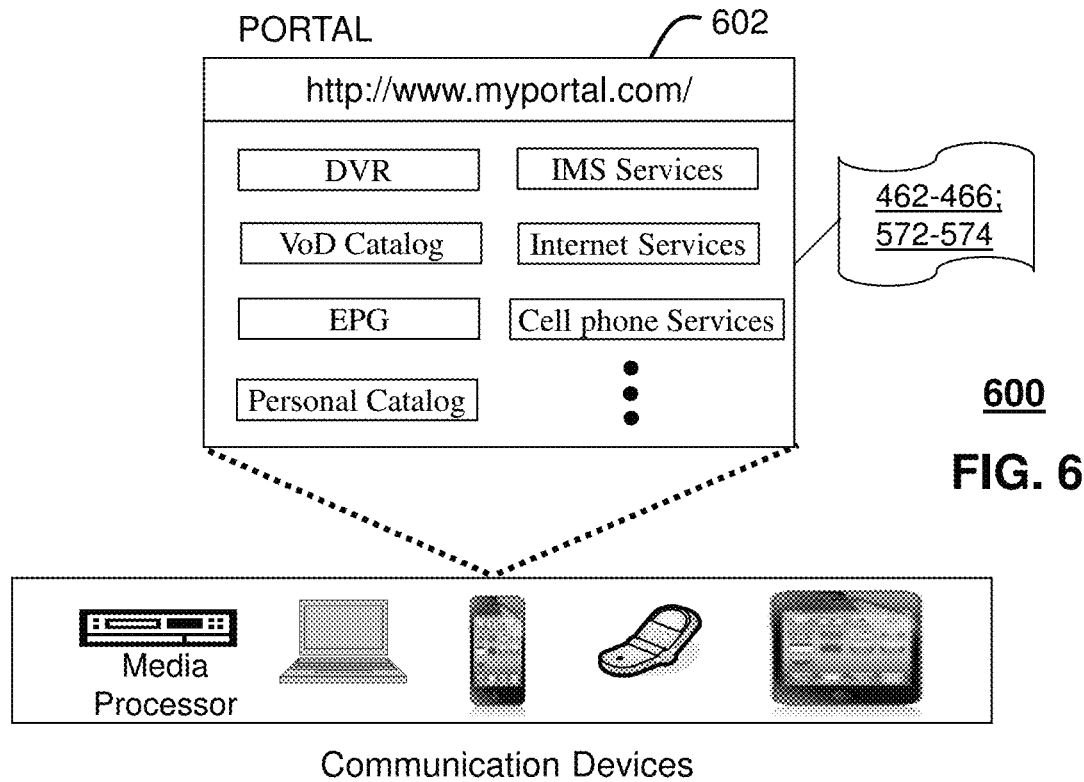
FIG. 6 depicts an illustrative embodiment of a web portal for interacting with the communication systems of FIGS. 1 and 4-5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1, and communication systems 400-500. For instance, users of the services provided by media proxy 130 or media proxy 430 can log into their on-line accounts and provision the media proxy 130 or media proxy 430 with user profiles or learned behaviors to enable them to better predict video buffer size, as described in FIGS. 1-5, and so on. Service providers can log onto an administrator account to provision, monitor and/or maintain the system 100 of FIG. 1 or media proxy 430.

Figure 7:
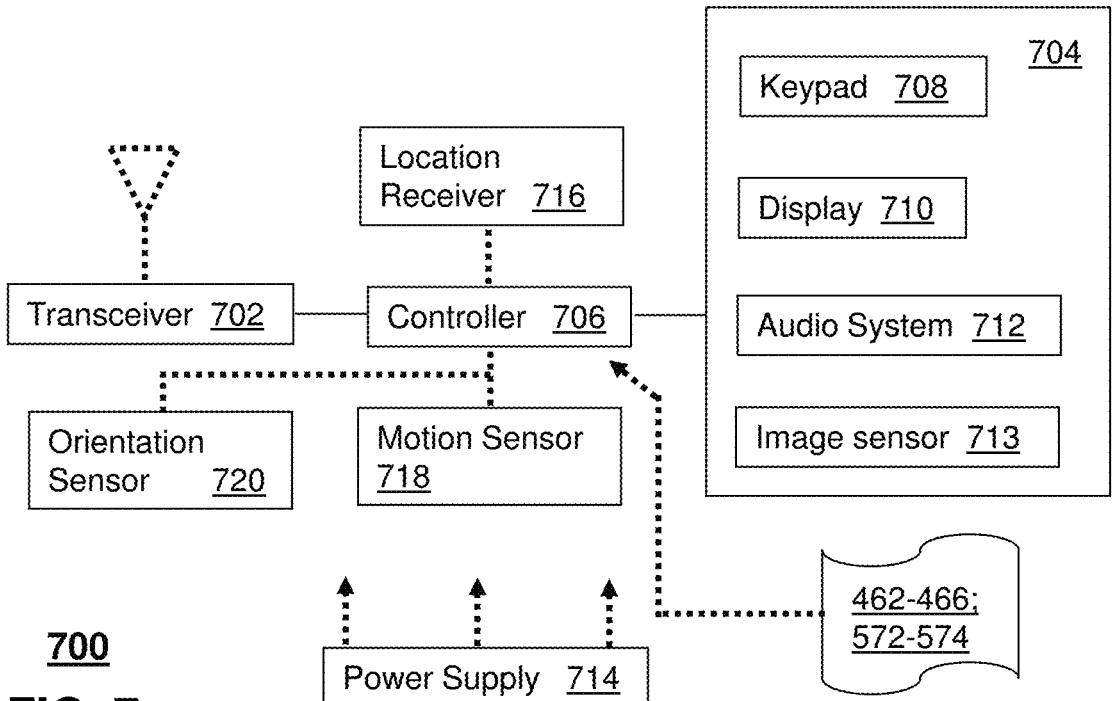
FIG. 7 depicts an illustrative embodiment of a communication device.

FIG. 7 depicts an illustrative embodiment of a communication device 700. Communication device 700 can serve in whole or in part as an illustrative embodiment of the communication devices 116 depicted in FIG. 1, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high-volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of communication devices 116 of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system 100 of FIG. 1, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, although the media proxy 130 is illustrated as being implemented within the service provider network infrastructure 120, components of the media proxy, or the entire media proxy itself may be implemented in the communication devices 116, or even in servers located in the Internet 140.

For example, in another embodiment, the proposed framework can be used as an Internet data service that serves other OTT video service providers, such as Netflix and YouTube. The data service can help the video service providers reduce their bandwidth/CDN cost, which is considered a large fraction of cost of running OTT video services. This mutual benefit provides incentives for both ISPs that are running mobile networks and OTT video providers to collaborate. In addition, the framework can be easily extended to OTT applications in future 5G networks.

In yet another embodiment, the ML algorithm can detect whether the user is likely to skip an advertising video after a prescribed period of time. When skipping such ads are likely, the system can save bandwidth by reducing buffer size to eliminate sending video data that would not be needed. Such probability can be discerned based on historical information gathered from previous viewers of particular ads, as well as the propensity of an individual user to skip ads in general. Other embodiments can be used in the subject disclosure.

Devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
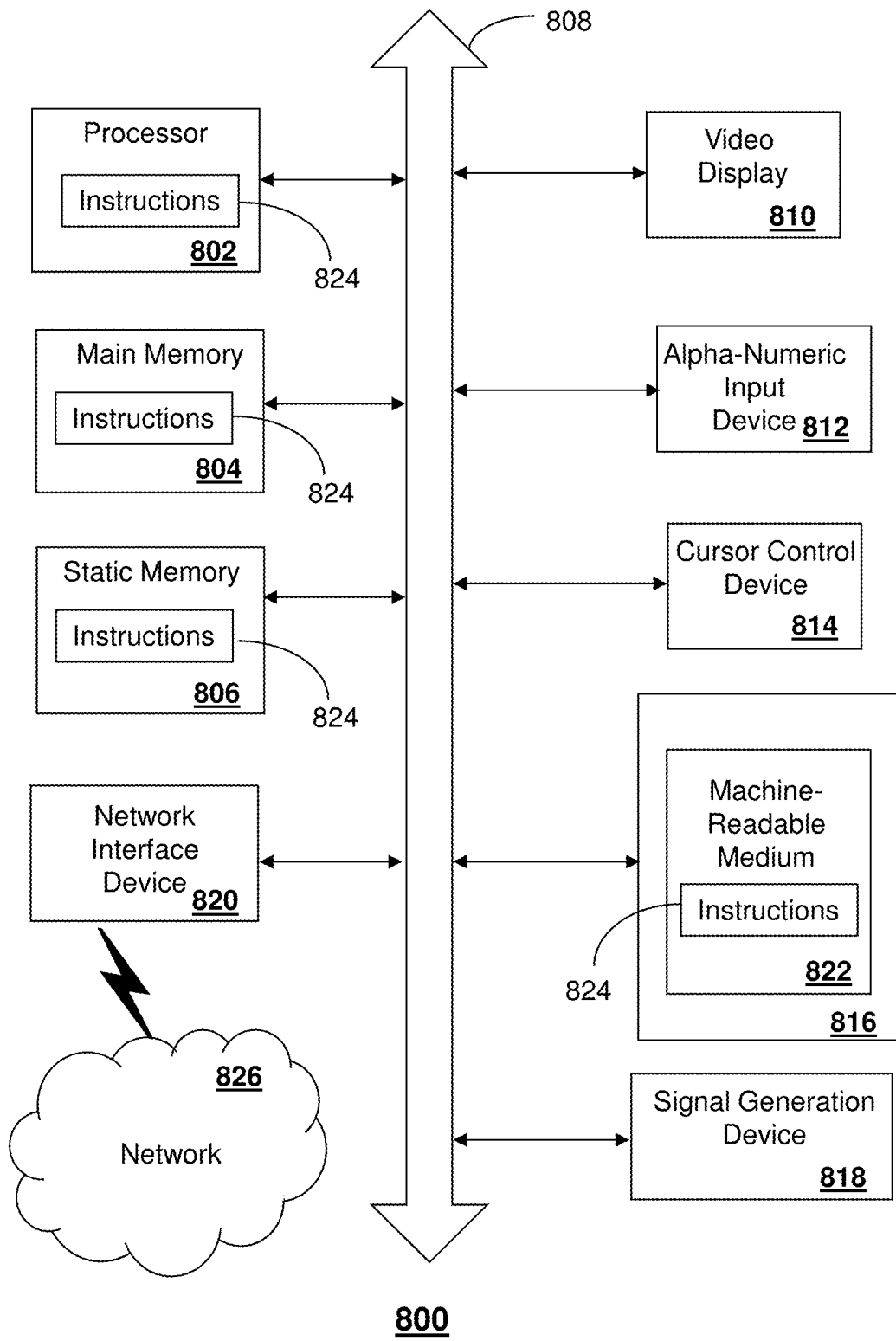
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the media proxy 430, the media processor 406, the media proxy 130 and other devices of FIGS. 1-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid-state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth,® Wi-Fi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all the features described with respect to an embodiment can also be utilized.

Less than all the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. The processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations," this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, the operations comprising:
     applying a fast Fourier transform to a set of traffic counters extracted from a video streamed by a user of a communication device to create a traffic feature vector, wherein the set of traffic counters includes a total watching time; and
     providing instructions to the communication device to update a size of a video buffer in the communication device based on the traffic feature vector.

2. The device of claim 1, wherein the set of traffic counters includes a video content type.

3. The device of claim 1, wherein the size of the video buffer is based on a machine learning algorithm applied to the traffic feature vector.

4. The device of claim 3, wherein the machine learning algorithm is trained on a plurality of vectors.

5. The device of claim 4, wherein a reward function trains the machine learning algorithm.

6. The device of claim 5, wherein the machine learning algorithm determines buffer size based on whether the video streaming is predicted to have a stable viewing state.

7. The device of claim 1, wherein the operations further comprise adjusting the size of the video buffer.

8. The device of claim 1, wherein the set of traffic counters includes a total content time.

9. The device of claim 1, wherein the set of traffic counters includes a duration of pause time.

10. The device of claim 1, wherein the set of traffic counters includes an amount of forwarding time.

11. The device of claim 1, wherein the set of traffic counters includes an amount of rewind time.

12. The device of claim 1, wherein the processor comprises a plurality of processors operating in a distributed processing environment.

13. A non-transitory machine-readable medium, comprising executable instructions that, when executed by a processing system including a processor, facilitate performance of operations, the operations comprising:

applying a fast Fourier transform to a set of traffic counters extracted from a video streamed by a user of a communication device to create a traffic feature vector, wherein the set of traffic counters includes an amount of forwarding time; and updating a size of a video buffer in the communication device based on the traffic feature vector.

14. The non-transitory machine-readable medium of claim 13, wherein the size of the video buffer is determined by training on a plurality of traffic feature vectors.

15. The non-transitory machine-readable medium of claim 14, wherein the size of the video buffer is based on applying a prediction model to a current traffic feature vector.

16. The non-transitory machine-readable medium of claim 13, wherein the processor comprises a plurality of processors operating in a distributed processing environment.

17. The non-transitory machine-readable medium of claim 13, wherein the set of traffic counters includes an amount of rewind time.

18. A method, comprising:

creating, by a processing system comprising a processor, a prediction model from a plurality of traffic feature vectors, wherein the plurality of traffic feature vectors is mapped from a plurality of traffic counters derived from simulated network conditions; and applying, by the processing system, the prediction model to a current traffic feature vector to update a video buffer size for a communication device.

19. The method of claim 18, wherein the applying further comprises:

determining whether the video buffer size is less than a predetermined video buffer size; and updating the video buffer size to the predetermined video buffer size responsive to the video buffer size being less than the predetermined video buffer size.

20. The method of claim 19, further comprising: filling a video buffer with video data to the video buffer size to support video streaming.

* * * * *